United States Patent
Cruveiller et al.

(10) Patent No.: US 7,618,238 B2
(45) Date of Patent: Nov. 17, 2009

(54) ANTI-IMPACT SHIELD FOR A MECHANICAL PART

(75) Inventors: Guy Cruveiller, Marignane (FR); Cyril Bourdier, Aix en Provence (FR); Mikael Schirra, Miramas (FR)

(73) Assignee: Eurocopter, Marignane (FR)

( * ) Notice: Subject to any disclaimer, the term of this patent is extended or adjusted under 35 U.S.C. 154(b) by 556 days.

(21) Appl. No.: 11/599,333

(22) Filed: Nov. 15, 2006

(65) Prior Publication Data

US 2007/0123107 A1    May 31, 2007

(30) Foreign Application Priority Data

Nov. 29, 2005   (FR)   ................... 05 12057

(51) Int. Cl.
    *B64C 11/32*   (2006.01)
(52) U.S. Cl. .................................. 416/170 R
(58) Field of Classification Search ............. 416/170 R, 416/159
    See application file for complete search history.

(56) References Cited

U.S. PATENT DOCUMENTS

| | | | | |
|---|---|---|---|---|
| 4,047,838 A | * | 9/1977 | Ferris et al. ................. | 416/115 |
| 4,630,998 A | * | 12/1986 | Leman et al. ............ | 416/134 A |
| 5,120,195 A | * | 6/1992 | Schmaling et al. ...... | 416/134 A |
| 6,140,720 A | | 10/2000 | Certain et al. | |

FOREIGN PATENT DOCUMENTS

EP    1 088 754    4/2001

* cited by examiner

*Primary Examiner*—Ninh H Nguyen
(74) *Attorney, Agent, or Firm*—Young & Thompson

(57) ABSTRACT

An anti-impact shield (50) for a mechanical part (22) of a rotorcraft, the mechanical part (22) having a central portion (221) together with first and second U-shaped ends (EX1, EX2) each having a bottom wall (225) and two side branches (224), the bottom walls (225) of the ends (EX1, EX2) of the mechanical part (22) being parallel to each other and secured to the central portion (221) Furthermore, the shield (50) is provided with first and second U-shaped ends (51, 52) respectively held inside the first and second ends (EX1, EX2) of the mechanical part (22) by interference of shapes, the first and second ends (51, 52) of the shield (50) each having a respective bottom wall (53) and two side branches (54).

15 Claims, 3 Drawing Sheets

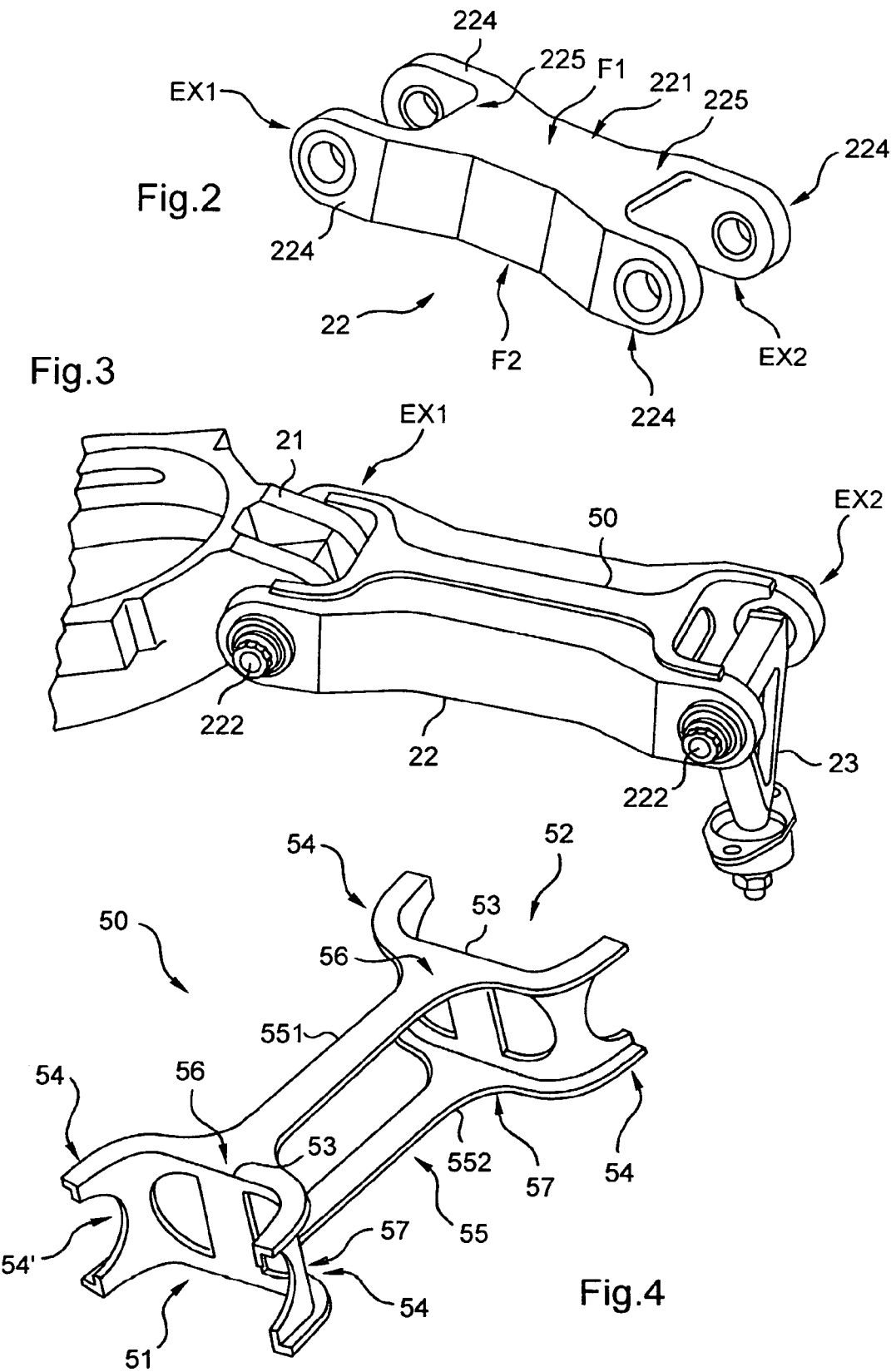

ANTI-IMPACT SHIELD FOR A MECHANICAL PART

The present invention relates to an anti-impact shield providing a mechanical part with shield against impacts, and in particular for providing shield to a scissors linkage of a main rotor of a rotorcraft.

BACKGROUND OF THE INVENTION

The purpose of the main rotor of a rotorcraft is to provide the rotorcraft with lift, and also with propulsion. Conventionally, such a main rotor, driven by a suitable engine, has a rotor shaft that serves to cause a plurality of blades to rotate by means of a rotor hub.

In order to provide lift and/or propulsion, the pitch of the blades, i.e. the angle of inclination of the blade sections relative to the plane of the rotor hub, is adjusted by means of pitch control rods and swash plates surrounding the rotor shaft, the swash plates comprising in principle a rotary plate associated with the pitch control rods and a non-rotary plate.

The non-rotary plate is situated beneath the rotary plate and imparts movements thereto. Thus, the rotary plate follows all of the movements of the non-rotary plate and transmits them to the blades via the pitch control rod.

Thus, with the help of a plurality of servo-controls, e.g. connected to the structure of the rotorcraft and to the non-rotary plate, swash plates are capable of being moved in translation along the axis of the rotor shaft and also of being tilted relative to said rotor shaft. Usually, such movement in translation and in tilting is achieved with the help of a device including a ball joint capable of sliding along the shaft of the rotor, and having the swash plates arranged thereon.

In order to optimize the dimensioning of the various mechanical parts, the non-rotary plate is secured to the structure of the rotorcraft, in particular with the help of at least one stationary scissors linkage that consequently serves to prevent it from turning.

The same considerations lead to providing the rotary plate with at least one rotary scissors linkage connected to the rotor shaft in order to ensure that the rotary plate is constrained to rotate at the same speed as the rotor hub.

A scissors linkage, whether rotary or non-rotary, generally comprises two hinged arms. More precisely, it comprises a primary arm and a secondary arm, the primary arm being connected, depending on the configuration, either to the rotor shaft or to the structure of the rotorcraft.

The primary arm comprises a central portion and two U-shaped ends, i.e. ends each having a bottom wall and two side branches, the bottom wall of each end being secured to the central portion.

The secondary arm is then disposed between the two side branches at a first end of the primary arm which is secured thereto by means of a pin. The connection to the rotor shaft or to the structure of the rotorcraft is provided in similar manner via the second end of the primary arm.

In normal operation, there is no risk of interference between the primary arm and the secondary arm or between the primary arm and the mount on the rotor shaft or on the structure of the rotorcraft, referred to for convenience below as the "mount" regardless of the configuration, i.e. whether associated with the rotary scissors linkage or the stationary scissors linkage.

However the same does not apply when certain operations are being performed, in particular maintenance operations in which an operator can be caused to move the scissors linkage beyond its normal range of movement. Impacts are then sometimes to be observed between the first and second ends of the primary arm and respectively the secondary arm or the mount, thereby naturally leading to damage to the primary arm, for example. This drawback is particularly troublesome since any damage is situated in a zone that is highly stressed in terms of vibratory fatigue, which leads to a reduction in the lifetime of the damaged mechanical part.

In this context, the manufacturer protects the various elements, the mount and also the primary and secondary arms, by means of anti-impact paint. Such paint is very brittle so as to perform its function of revealing any damage.

Nevertheless, the paint is effective for a single impact only, since multiple impacts have the consequence of causing the paint to flake away, thereby leaving the scissor linkage "bare" and thus vulnerable. As a result it is necessary to disassemble the scissor linkage and repaint it as soon as a single impact has occurred, where such a procedure is manifestly expensive, constraining, and penalizing in terms of rotorcraft non-availability.

OBJECTS AND SUMMARY OF THE INVENTION

An object of the present invention is thus to provide a mechanical part of a rotorcraft with shield against impacts, and more particularly to protect the primary arm of a rotary or non-rotary scissors linkage of a rotor, the anti-impact shield being provided by shield means that satisfy constraints, in particular in terms of dimensions, mechanical strength, cost, weight, and implementation.

The invention provides an assembly constituted by an anti-impact shield and a mechanical part, said mechanical part comprising a central portion together with first and second U-shaped ends each having a bottom wall and two side branches, said bottom walls of the ends of said mechanical part being parallel to each other and secured to the central portion, which assembly is remarkable in that said shield is provided with first and second U-shaped ends respectively held inside the first and second ends of said mechanical part by interference of shapes, said first and second ends of said shield each having a respective bottom wall and two side branches.

Consequently, the anti-impact shield is held in place very well because of shape interference between the shield and the mechanical part. In order to maximize this interference, the two side branches at a given end of the shield describe an angular field lying in the range 5° to 15°, and preferably equal to 10°, unlike the side branches at the same end of the same mechanical part, which branches are parallel to each other.

In addition, in an implementation of the invention to providing a rotary or a non-rotary scissors linkage of a rotorcraft rotor with shield against multiple impacts, the mechanical part is the primary arm of the scissor linkage.

Consequently, shield is effective even if the scissor linkage is subjected to a plurality of impacts, insofar as the shield runs no risk of flaking, unlike shield implemented using anti-impact paint.

Furthermore, since the shield closely matches the shape of the mechanical part that is to be protected, there is no need to modify said part, thereby sparing the manufacturer of said mechanical part any additional development cost. More precisely, when dealing with a part of a rotorcraft rotor scissors linkage, any modification thereto would lead to large costs in order to ensure that the new configuration complies with the specifications required, given that a rotorcraft scissors linkage is considered as being a vital part.

Another advantage lies in the fact that the scissor linkage has at least three elements that might be damaged by impacts: the mount, the primary arm, and the secondary arm. As explained above, impacts occur either between the mount and the primary arm or else between the primary arm and the secondary arm. Consequently, disposing an anti-impact shield on the primary arm makes it possible to protect all of the elements of the scissor linkage, and that is not negligible.

Furthermore, and preferably, the first and second ends of the anti-impact shield are interconnected by a connection strip that provides tension between said first and second ends of the shield. This connection strip then optionally comprises a top tape and bottom tape, the top tape interconnecting the top portions of the first and second ends of the shield while the bottom tape interconnects the bottom portions of the first and second ends of said shield.

Consequently, the first and second ends of the shield are held inside the first and second ends of the mechanical part and are interconnected by a top tape and a bottom tape. It can thus readily be understood that the top and bottom tapes are disposed respectively on the top and bottom faces of the mechanical part.

Furthermore, the top and bottom tapes are extremely useful since they contribute to putting the first and second ends of the shield properly into place, by ensuring a small amount of tension between said ends of the shield, thereby pressing them properly against the insides of the first and second ends of the mechanical part.

Thus, the anti-impact shield is held securely on the mechanical part that is to be protected, thus making it compatible with the various stresses to which the mechanical part will be subjected in use when it is the primary arm of a scissors linkage of a rotorcraft rotor, e.g. centrifugal force and bad weather.

In addition, the width of the connection strip is advantageously narrower than the width of the central portion of the mechanical part. Optimizing the width of the connection strip makes it possible to minimize the weight of the shield.

It will also be understood that it is easy to handle the shield, consequently enabling it to be mounted and removed easily and quickly by an operator, which can be extremely useful during maintenance and inspection operations.

Furthermore, the side branches of an end of the mechanical part are pierced in order to pass a pin for securing the mechanical part to another part, e.g. for securing the primary arm to the secondary arm in a scissors linkage for a rotorcraft rotor. Given the need to pass such a pin, the end of each side branch at least one end of the shield is notched so that the end of the shield then fits closely to the shape of the pin.

Preferably, the first end and/or the second end of the shield includes a rim. These rims then rest against the top and bottom faces at the ends of the mechanical part and thus contribute to holding the shield in position. Nevertheless, the rims are not restricted to this function since they also stiffen the U-shaped ends of the shield, thereby limiting any deformation that might be caused in use, e.g. by centrifugal forces in flight, still in the context of a scissors linkage for a rotorcraft rotor.

Furthermore, in order to optimize the weight of the shield and to make it easier for fluid to flow freely, the bottom wall at the first and/or second end of the shield is provided with an opening.

Nevertheless, the tension caused by the connection strip in such a configuration can lead to the bottom wall being deflected. Consequently, it is advantageous for the opening to include reinforcement providing it with shield against this small risk of deflection.

Finally, in order to ensure that the shield is effective against impacts, while still having sufficient flexibility to enable it to be put into place, the shield is made of elastomer, and specifically of polyurethane having hardness lying in the range 70 to 90 on the Shore scale, and preferably equal to 80 on the Shore scale.

BRIEF DESCRIPTION OF THE DRAWINGS

The invention and its advantages appear in greater detail from the following description of a preferred embodiment given without any limiting character and with reference to the accompanying figures, in which:

FIG. 2 is an isometric view of a primary arm;

FIG. 3 shows a scissors linkage in which the primary arm is provided with anti-impact shield of the invention;

FIG. 4 is an isometric view of an anti-impact shield of the invention;

MORE DETAILED DESCRIPTION

Elements shown in more than one of the figures are given the same references in each of them.

Figure 1:
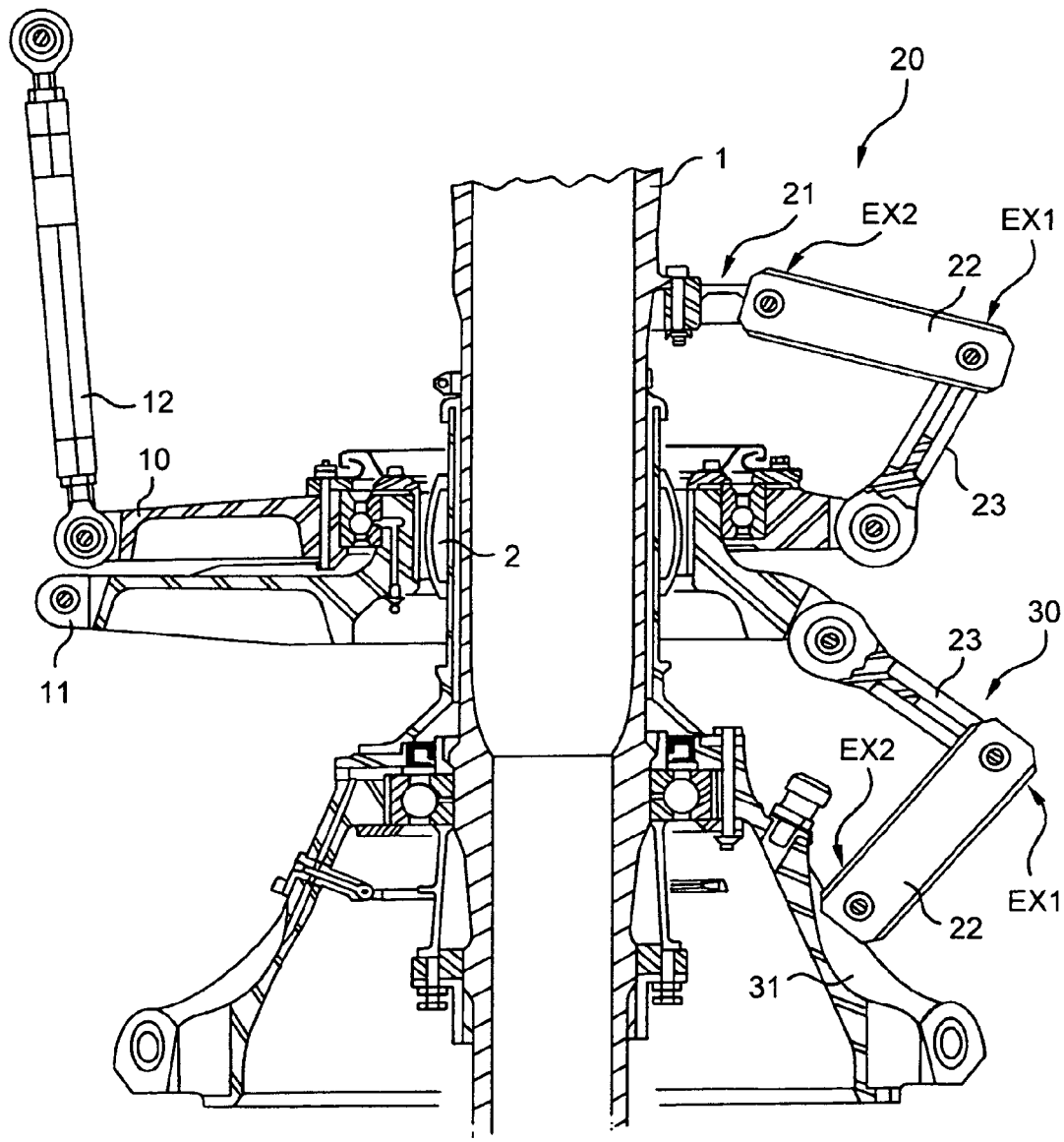
FIG. 1 is a diagrammatic section of a rotorcraft rotor shaft.

FIG. 1 is a diagrammatic section of a rotorcraft rotor shaft 1.

The rotor shaft 1 drives the blades of the rotorcraft via a rotor hub, with the pitch of the blades being adjusted by means of pitch control rods 12 connected to the blades, and with the help of swash plates.

The swash plates comprise a non-rotary plate 11 controlled by servo-controls that are not shown, and a rotary plate 10 constrained to rotate with the pitch control rods 12. Thereafter, the pilot of the rotorcraft modifies the pitch of the blades by means of instruments which activate the servo-controls. Under the effect of such instruments, the non-rotary plate 11 moves in translation along the rotor shaft 1 and/or tilts relative to said rotor shaft 1, with the rotary blades 10 then following the movements of the non-rotary plate 11 and conveying them to the blades via the pitch control rods 12. The movements in translation and in inclination of the swash plates are made about a ball joint 2 suitable for moving along the rotor shaft 1.

In order to ensure that the non-rotary plate 11 does not start to move in rotation, the non-rotary plate 11 is connected to a fork 31 of the rotorcraft structure via a stationary scissors linkage 30.

In identical manner, the rotary plate 10 is connected to a driver 21 secured to the rotor shaft 1 via a rotary scissors linkage 20.

As explained in the introduction to this description, the driver 21 and the fork 31 are referred to by convenience as "mounts".

A scissors linkage, whether rotary 20 or stationary 30, comprises a secondary arm 23 and a primary arm 22, the primary arm being secured via its first end EX1 and its second end EX2, respectively to the secondary arm 23 and to the mount 21 or 31.

FIG. 2 is an isometric view of the primary arm 22 which as a top face F1 and a bottom face F2.

The primary arm has a central portion 221 with a first end EX1 and a second end EX2 that are both U-shaped. Each of the first and second ends EX1 and EX2 is provided with a respective bottom wall 225 and two side branches 224, the bottom walls 225 of the two ends EX1 and EX2 of the primary arm 22 being parallel to each other and secured to the central portion 221.

When acting on the equipment, e.g. during maintenance, an operator can accidentally cause a scissors linkage to move into a position that can lead to impacts between the main arm and the mount or between the main arm and the secondary arm. These impacts occur at the ends EX1, EX2 of the primary arm, and more particularly where the side branches join the bottom walls, and this can be harmful.

The present invention thus seeks to provide shield against impacts for a mechanical part of a rotorcraft, such as a primary arm of a scissors linkage of a rotorcraft rotor.

In this context, FIG. 3 shows an anti-impact shield 50 of the invention put into place on a mechanical part, and more particularly the primary arm 22 of a stationary or rotary scissors linkage of a rotorcraft rotor.

It can be seen that the side branches of the first and second ends EX1 and EX2 of the mechanical part 22 are pierced so as to be capable of receiving pins 222 enabling the mechanical part 22 to be secured to a mount 21 and to a secondary arm 23. Furthermore, it can be seen that the mount 21 and the secondary arm 23 are disposed between the side branches of the first and second ends EX1 and EX2 of the mechanical part 22.

FIG. 4 shows the anti-impact shield 50 more precisely in an isometric view. This shield 50 has first and second U-shaped ends 51 and 52. Each end 51, 52 of the shield 50 is provided with a bottom wall 53 of rectangular section and two side branches 54 of rectangular section.

In addition, the first and second ends 51 and 52 of the shield 50 are interconnected by a connection strip 55 which provides a small amount of tension in operation. The connection strip 55 is provided with a top tape 551 and a bottom tape 552, the top tape 551 serving to interconnect the top portions 56 of the first and second ends 51 and 52 of the shield, while the bottom tape 552 serves to interconnect their bottom portions 57.

As can be seen in FIG. 3, the width of the connection strip 55 is advantageously narrower than the width of the mechanical part 22. In addition, it will readily be understood that the bottom and top tapes 552 and 551 are disposed respectively against the bottom and top faces F2 and F1 of the mechanical part 22.

Furthermore, the ends of the side branches 54 of the first and second ends 51 and 52 of the shield 50 are notched, such that each of them presents a concave shape 54'. As a result, the first and second ends 51 and 52 of the shield 50 fit closely around the shape of the pin 222 used for fastening the mechanical part as described above.

Figure 5:
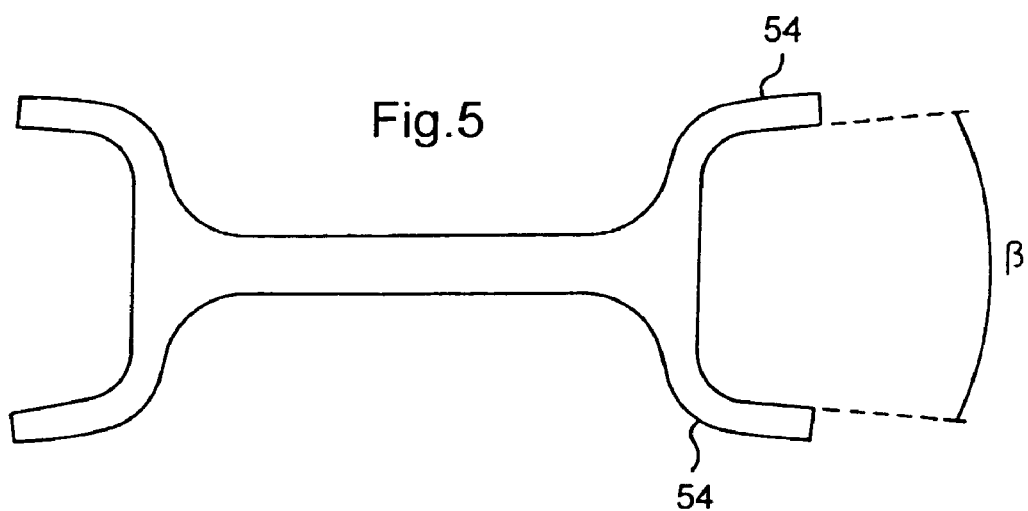
FIG. 5 is a plan view of an anti-impact shield.

FIG. 5 is a plan view of the shield 50. The two side branches 54 of a given end of the shield describe an angular field β lying in the range 5° to 15°, and preferably equal to 10°, unlike the side branches 224 at the same end of the mechanical part that is to be protected. This technical characteristic contributes actively to the shield 50 being properly positioned in use by pressing the side branches 54 of the shield against the side branches 224 of the mechanical part 22.

Figure 6:
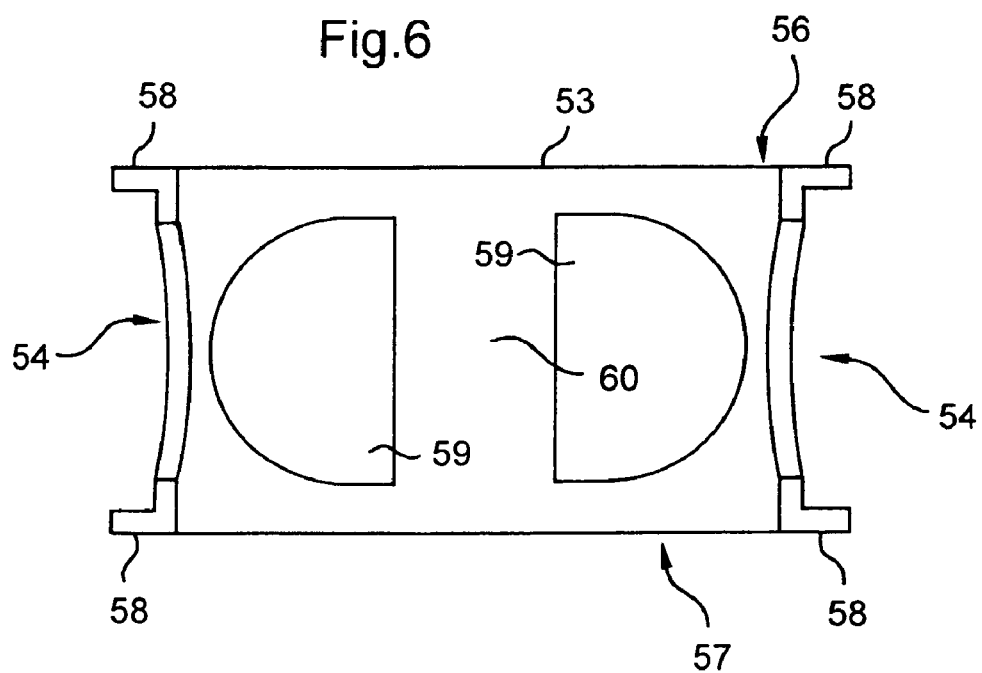
FIG. 6 is a face view of the anti-impact shield.

FIG. 6 is an end view of the shield 50, and more particularly of the first end 51 of said shield.

This first end 51 has a rim 58 on the top and bottom portions 56 and 57 of the side branches 54. The same applies at the second end 52 in the variant shown in FIG. 4.

Once the shield 50 has been put into place on the mechanical part 22, these rims 58 are pressed against the top and bottom faces F1 and F2 of the mechanical part 22, thus contributing to holding the shield 50 in position. In addition, these rims are also useful since they contribute to stiffening the shield 50, thereby limiting any risk of it deforming under high levels of stress.

In addition, the end walls 53 of the first and second ends 51 and 52 of the shield advantageously include respective openings 59.

Figure 7:
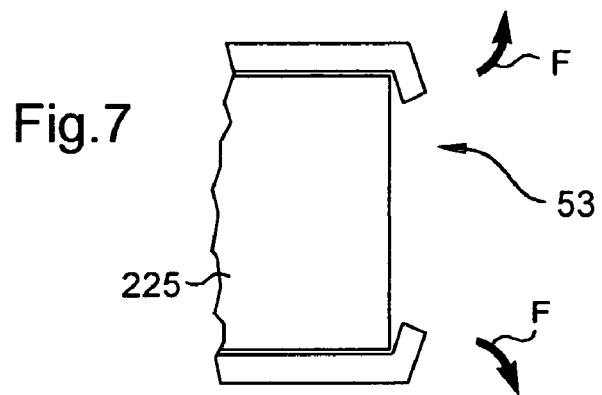
FIG. 7 is a diagram showing possible deflection of the bottom wall at the ends of the shield.

Nevertheless, under the effect of the tension exerted by the connection strip 55, the bottom wall 53 of the shield 50 might deflect a little, with this deflection being represented by arrows F in FIG. 7. In order to avoid this phenomenon completely, the opening 59 is then provided with reinforcement 60, advantageously situated substantially in the middle of the opening 59.

Consequently, once the shield 50 has been put into place by an operator, it is pressed closely against the mechanical part firstly because of shape interference associated with the presence of the connection strip and with the angular field defined by the side branches 54 of the shield 50, and secondly because of the presence of rims 58 on the first and second ends 51 and 52 of the shield 50. These first and second ends 51 and 52 are then held firmly inside the first and second ends EX1 and EX2 of the mechanical part 22.

Finally, the shield 50 is made of an elastomer type material and more particularly out of polyurethane having hardness lying in the range 70 to 90 on the Shore scale, and preferably to equal to 80 on the Shore scale. This material serves to deal with the various problems that need to be solved, while being sufficiently flexible to allow the shield 50 to be put into place on the mechanical part 22, and while presenting the low hardness required for protecting the mechanical part 22 against a plurality of impacts.

Naturally, the present invention can be subjected to numerous variations concerning its implementation. Although one embodiment is described above, it will readily be understood that it is not conceivable to identify exhaustively all possible embodiments. It is naturally possible to envisage replacing any of the means described by equivalent means without going beyond the ambit of the present invention.

What is claimed is:

1. An assembly constituted by an anti-impact shield (50) and a mechanical part (22), said mechanical part (22) comprising a central portion (221) together with first and second U-shaped ends (EX1, EX2) each having a bottom wall (225) and two side branches (224), said bottom walls (225) of the ends (EX1, EX2) of said mechanical part (22) being parallel to each other and secured to the central portion (221), wherein said shield (50) is provided with first and second U-shaped ends (51, 52) respectively held inside the first and second ends (EX1, EX2) of said mechanical part (22) by interference of shapes, said first and second ends (51, 52) of said shield (50) each having a respective bottom wall (53) and two side branches (54).

2. An assembly constituted by an anti-impact shield (50) and a mechanical part (22) according to claim 1, wherein said mechanical part (22) is a primary arm (22) of a scissors linkage (20, 30) of a rotorcraft rotor.

3. An assembly constituted by an anti-impact shield (50) and a mechanical part (22) according to claim 1, wherein said first and second ends (51, 52) of said shield (50) are connected together by a connection strip (55) that provides tension between said first and second ends (51, 52) of said shield (50).

4. An assembly constituted by an anti-impact shield (50) and a mechanical part (22) according to claim 3, wherein the width of said connection strip (55) is narrower than the width of the central portion (221) of said mechanical part (22).

5. An assembly constituted by an anti-impact shield (50) and a mechanical part (22) according to claim 1, wherein said connection strip (55) comprises a top tape (551) and a bottom tape (552), said top tape (551) interconnecting the top portions (56) of the first and second ends (51 and 52) of said shield (50), said bottom tape (552) interconnecting the bottom portions (57) of the first and second ends (51, 52) of said shield (50).

6. An assembly constituted by an anti-impact shield (50) and a mechanical part (22) according to claim 1, wherein said two side branches (54) at a given end (51, 52) of said shield (50) describe an angular field ($\beta$) lying in the range 5° to 15°.

7. An assembly constituted by an anti-impact shield (50) and a mechanical part (22) according to claim 1, wherein the end of each side branch (54) of at least one of the ends (51, 52) of said shield (50) is notched.

8. An assembly constituted by an anti-impact shield (50) and a mechanical part (22) according to claim 7, wherein said angular field ($\beta$) is about 10°.

9. An assembly constituted by an anti-impact shield (50) and a mechanical part (22) according to claim 1, wherein said first end (51) of said shield (50) includes a rim (58).

10. An assembly constituted by an anti-impact shield (50) and a mechanical part (22) according to claim 1, wherein said second (52) of said shield (50) includes a rim (58).

11. An assembly constituted by an anti-impact shield (50) and a mechanical part (22) according to claim 1, wherein said bottom wall (53) of the first end (51) of said shield (50) is provided with an opening (59).

12. An assembly constituted by an anti-impact shield (50) and a mechanical part (22) according to claim 11, wherein said opening (59) includes reinforcement (60).

13. An assembly constituted by an anti-impact shield (50) and a mechanical part (22) according to claim 1, wherein the bottom wall (53) of the second end (52) of said shield (50) is provided with an opening (59).

14. An assembly constituted by an anti-impact shield (50) and a mechanical part (22) according to claim 1, wherein said shield (50) is made of polyurethane having hardness lying in the range 70 to 90 on the Shore scale.

15. An assembly constituted by an anti-impact shield (50) and a mechanical part (22) according to claim 14, wherein said hardness is equal to 80 on the Shore scale.

* * * * *